Figure 5:
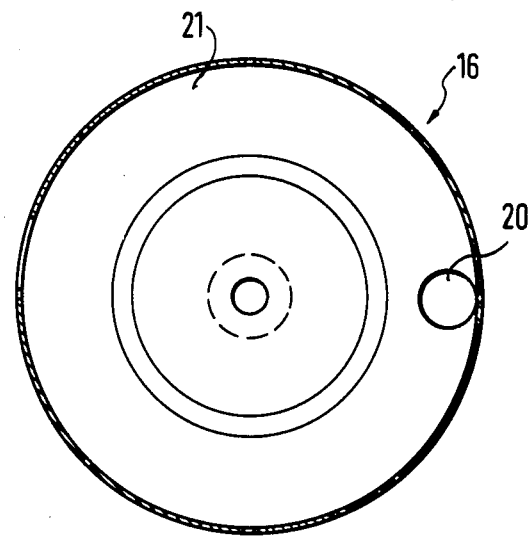

United States Patent [19]

von Stein et al.

[11] 4,283,623
[45] Aug. 11, 1981

[54] READING APPARATUS FOR READING COLORED MARKINGS APPLIED TO OBJECTS

[75] Inventors: Walter von Stein, Waldkirch; Günter Fetzer, Gundelfingen, both of Fed. Rep. of Germany

[73] Assignee: Erwin Sick Gesellschaft mit beschränkter Haftung Optik-Elektronik, Waldkirch, Fed. Rep. of Germany

[21] Appl. No.: 946,165

[22] Filed: Sep. 27, 1978

[30] Foreign Application Priority Data

Sep. 27, 1977 [DE] Fed. Rep. of Germany ....... 2743459

[51] Int. Cl.$^3$ .................... G06K 7/12; B07C 5/342; G06K 7/10; G06K 9/00
[52] U.S. Cl. .................... 235/465; 209/580; 235/454; 235/467; 340/146.3 B
[58] Field of Search ............. 235/465, 454, 462, 463, 235/467; 250/226, 568; 209/580, 583, 584; 340/146.3 B

[56] References Cited

U.S. PATENT DOCUMENTS

| | | | |
|---|---|---|---|
| 2,956,264 | 10/1960 | Rohland | 235/454 |
| 3,513,320 | 5/1970 | Weldon | 209/580 |
| 3,663,801 | 5/1972 | Wahli | 340/146.3 B |
| 3,689,744 | 9/1972 | Wildhaber | 235/462 |
| 3,760,161 | 9/1973 | Lohne | 235/467 |
| 3,809,894 | 5/1974 | Renzo | 250/568 |
| 3,920,124 | 11/1975 | Patterson | 209/583 |

*Primary Examiner*—Robert M. Kilgore

[57] ABSTRACT

Colored markings such as a series of colored rings applied to an ampoule are read by causing the ampoule to move beneath an illuminating system which projects white light at the colored markings. Light reflected or scattered from the colored markings is directed at an aperture member arranged in the field of view of a color sensitive photoelectric detector arrangement and the image of the colored markings moves in a first direction across this aperture member due to relative movement of the object. The aperture member has a series of spaced apart optical apertures which are sequentially moved in a second direction transverse to the first direction and in front of the photoelectric detector arrangement. The photoelectric detector arrangement produces signals corresponding to the transmission of the image of the colored markings through the optical apertures. The series of optical apertures includes read apertures for generating the afore-mentioned signals and recognition apertures which are of a smaller size and which are operative to generate further signals allowing the read signals to be recognized only when the object is centrally located in the field of view of the optical system. Read signals occurring during this time are subsequently processed to detect whether or not the correct sequence of colored markings is present.

18 Claims, 7 Drawing Figures

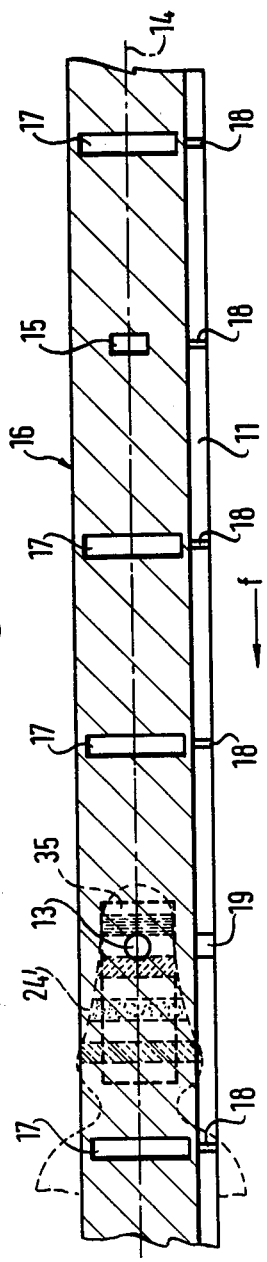
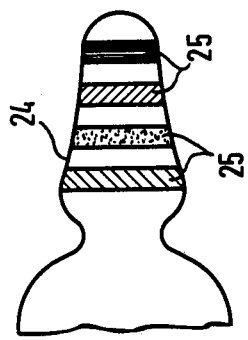
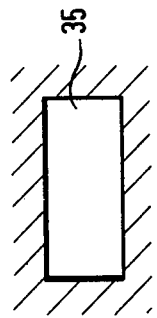

READING APPARATUS FOR READING COLORED MARKINGS APPLIED TO OBJECTS

This invention relates to reading apparatus suitable for reading coloured markings provided on an object and is particularly suitable for reading a code marking applied in the form of a series of discrete rings of different colours applied one behind the other on the tips of ampoules.

The ability to read such coloured markings enables, for example, a series of ampoules moving in a stream past the reading apparatus to be individually detected and for an error signal to be generated if an incorrectly marked ampoule should be present. The error signal can subsequently be used, if desired, to eject the incorrectly marked ampoule from the stream of correct ampoules.

A reading apparatus of the above kind is known from British Pat. No. 1,397,837. This apparatus features an illuminating system, which illuminates a zone through which objects bearing the coloured markings are to pass, and an optical processing system which receives light reflected or scattered from the coloured markings and directs it onto an aperture member in the form of a drum having a series of read slots spaced apart around its periphery. In operation, as ampoules move through the illuminated patch of light their image sweeps in a first direction through the image plane of the optical system along the surface of the drum and, as the drum is simultaneously rotating so that the read apertures sequentially move in a second direction transverse to the first across the image plane of the optical system light reflected from coloured markings is periodically transmitted through the read apertures. This light, i.e. that which is transmitted through the read apertures falls onto an optical receiving and detection system which has the capability of splitting the light into colours corresponding to the colours of the individual markings that have been detected and to direct the individual coloured beams of light onto respective photoelectric detectors. The output signals of the respective photoelectric detectors can then be compared with a desired set of values to check as to whether or not the correct markings are present.

It is a typical characteristic of a reading apparatus of the above kind that the intermediate image formed of the coloured markings is scanned a plurality of times during the time in which the object bearing the marking is moving past the reading apparatus. The reading thus takes place continuously as the object moves into and out of the illuminated area while its image is formed in the field of view of the the optical system. This means that a significant problem exists in starting and stopping the processing of the read signals at the correct times as the coloured markings are moving into and out of the field of view of the optical system.

It is accordingly a first object of the present invention to provide an improved reading apparatus of the kind set out above by means of which the presence of the arrangement of coloured markings in the field of view of the optical reading system can be recognized so that a recognition signal can be generated to signify the beginning and end of the period during which a reading of the coloured markings can take place through the read apertures of the aperture member. The invention thus seeks to provide a reading apparatus by means of which a reading of the coloured markings is avoided when the coloured markings only partially extend into the field of view of the optical system.

In accordance with the present invention there is provided reading apparatus suitable for reading coloured markings and comprising an illuminating system for producing an illuminating beam of light capable of illuminating coloured markings provided on an object during relative movement thereof through the beam of light, optical means capable of receiving light from coloured markings provided on an object as aforesaid and forming an image thereof moving in a first direction past an aperture member, the aperture member having a spaced apart series of optical apertures including first read apertures and at least one relatively smaller recognition aperture, there being further provided means for producing movement of the apertures of said aperture member sequentially in a second direction transverse to said first direction, a colour sensitive photoelectric detector arrangement disposed behind the aperture member to receive light from the coloured markings and transmitted through any of said first read apertures and said at least one recognition aperture to provide respective reading and recognition signals and means for recognising a reading signal only when a corresponding recognition signal has been detected.

Preferably the said at least one recognition aperture is symmetrically arranged about the central line along which the series of read apertures are arranged.

The read and recognition apertures are preferably both of elongate shape and the length of the recognition aperture is usefully between 5 and 95%, and preferably between 30 and 50%, and especially 40%, of the length of the read apertures.

The said at least one recognition aperture is preferably of the same width as the read aperture.

A recognition aperture is preferably arranged between two read apertures and is equally spaced from these two read apertures.

The essence of the invention is thus to be seen in the fact that at least one special recognition aperture is provided in the series of apertures on the aperture member and is so positioned that images of the coloured markings are first detected via the recognition aperture, after they have at first given rise to readings via earlier read apertures, and cease to be detected before they cease to give rise to readings via further read apertures.

The recognition aperture thus enables a signal to be produced which will allow only those signals occurring when the coloured markings are arranged approximately in the centre of the field of view of the optical system to be recognized. The apparatus is thus able, of its own account, to detect the presence of the coloured image in the field of view. Thus, in conjunction with the multiple scanning of the coloured image which takes place after recognition, a higher degree of operational accuracy is achieved because the multiple scanning only takes place once a coloured marking is optimally arranged relative to the optical means.

Preferably the length of the recognition aperture is so chosen that it enables the determination to be made whether or not the image of the coloured markings to be detected through the read apertures is at least 50% within the field of view of the read apparatus, i.e. of the photoelectric detector arrangement. From this moment on the multiple scanning takes place via the read apertures and indeed continues until, once more, less than 50% of the image of the coloured markings is located within the field of view of the read apparatus because at this time the recognition signal produced by the recognition aperture disappears once more and the reading is accordingly stopped.

The provision of a read aperture thus allows a kind of self pacing of the apparatus to take place by means of which the number of readings, i.e. the frequency with which the image is correctly detected through the read apertures is, with a suitable speed of relative movement, optimally utilised. The use of multiple readings allows the possibilities of making an acceptable/unacceptable decision or of forming a mean value or the like via a subsequent electronic logic cicuit.

The effect of the arrangement of the said at least one additional recognition aperture can also be regarded as a recognition of the central location. The said at least one recognition aperture thus also makes it possible to announce to the subsequent processing circuitry that the image of the coloured markings to be read are located in a predetermined central region of the field of view. It will be noted that this information has been determined from the coloured markings themselves and not from the surface of the ampoule or other object. This is important because the optical surface characteristics of certain objects, especially ampoules, are such that a determination of their exact position is otherwise relatively difficult.

A further object of the invention is to take into account changes in the luminance of the illuminating lamp, the spectral composition of the light given from the illuminating lamp and differential or changing spectral sensitivity of the photoelectric detector arrangement, so that these cannot have disadvantageous effects on the colour recognition.

In this connection the invention invisages that the aperture member, apart from the read apertures and if necessary the recognition aperture, has at least one reference opening through which a stream of white light from the illuminating lamp is directed as the reference opening passes the photoelectric detector arrangement so that the tapped off stream of white light is projected onto the photoelectric detector arrangement. The reference aperture is usefully a round aperture arranged on the central line along which the read apertures are arranged and preferably has a diameter approximately equal to the width of the read apertures. The reference aperture is advantageously arranged centrally between two read apertures.

In this way a reference size is provided which is repeated for each passage of the aperture member through the field of view of the optical system; i.e. with a slotted drum aperture member for each revolution thereof; by means of which all negative potentially disadvantageous time dependent drifts of the various optical or optical electronic components, which could lead to a false processing of the information from the image of the coloured markings, is excluded. An improvement in the judgement of the image of the coloured markings is thus also achieved with reference to its brightness. The significance of tapping off a portion of the light from the illuminating lamp for the reading apparatus is that it is the white value of the illuminating lamp which is projected via the reference aperture onto the photoelectric detector arrangement and this white value is thus processed in a corresponding manner to the measuring signals from the read apertures which originate from the same source. A suitable electronic circuit connected to the photoelectric detector arrangement can then store a value corresponding to this white value and use this value for regulating the analog measurement signal. It is thus no longer necessary to control the illumination lamp. In one embodiment the reference signal derived from the photoelectric detector arrangement by movement of the reference opening in front of its field of view is used to control a single or a plurality of preamplifiers arranged between the photoelectric detector arrangement and the processing circuitry for adjusting the values of the signals therefrom.

It is especially advantageous when the reading apparatus of the present invention is also provided with a code track located alongside the series of apertures and which has a respective code mark associated with each of the apertures. The code marks can be displaced by a predetermined amount in the direction of motion of the aperture member relative to the associated apertures which has the advantage that a photoelectric converter arrangement used to read the code markings can be likewise displaced from the photoelectric detector arrangement which supplies the measuring signals. A code mark is provided for each of the read apertures, the said at least one recognition aperture, and the reference aperture which makes it possible, in conjunction with a suitable detection apparatus, to decide at any moment which aperture is located in the field of view in front of the photoelectric detector arrangement. A suitable electronic processing circuit provided for processing the directly read measurement or reference signals can then readily sort out from the code marks precisely which signal is present.

Preferably the reading apparatus utilises a rotating drum with a cylindrical wall connected to a hub member the cylindrical wall being provided with slots to define the aperture member and there being a bore in the hub of the drum, in the vicinity of the reference aperture in the cylindrical wall, through which the light beam tapped off from the illumination lamp is passed prior to subsequent deflection through the reference opening onto the photoelectric detector arrangement via a deflecting mirror fastened to the drum.

Figure 4:
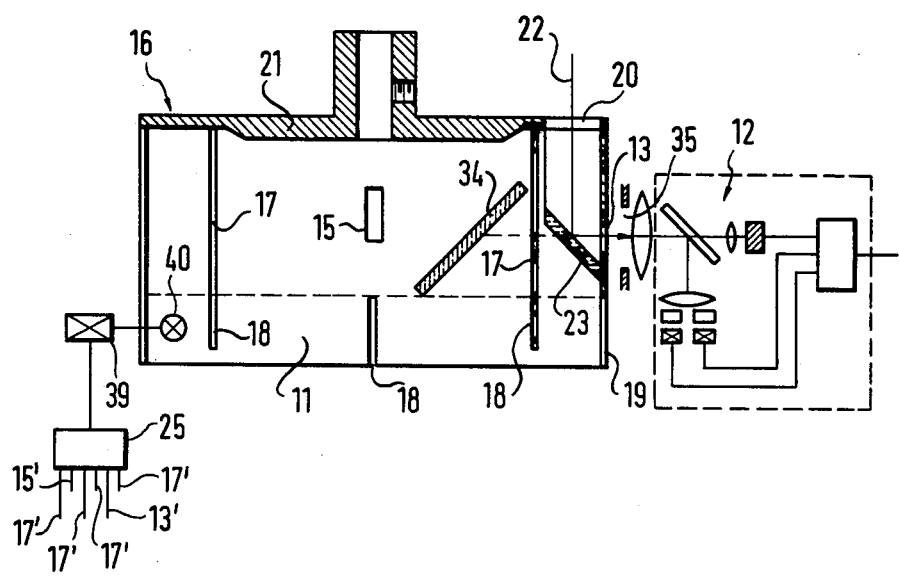
Figure 6:
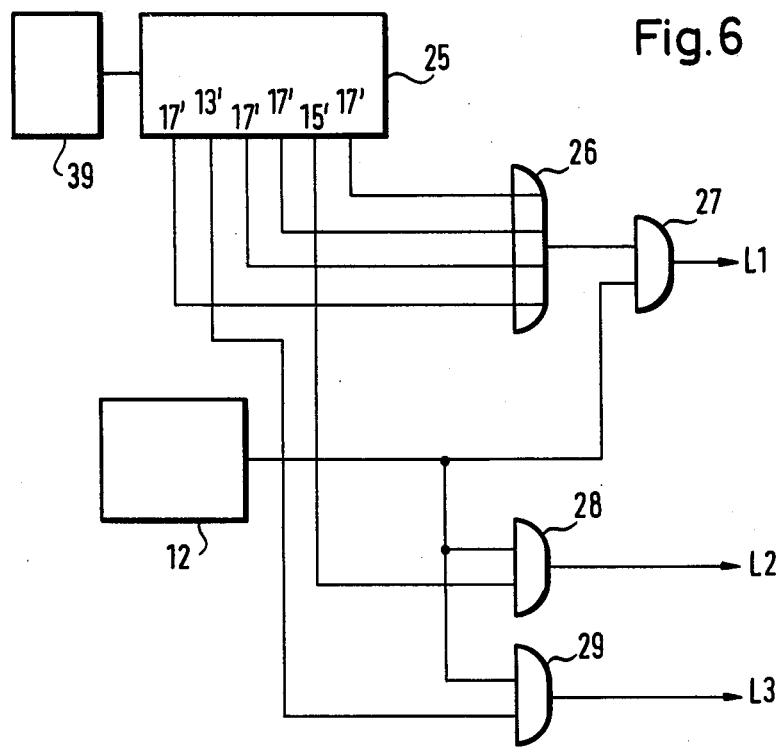
Figure 7:
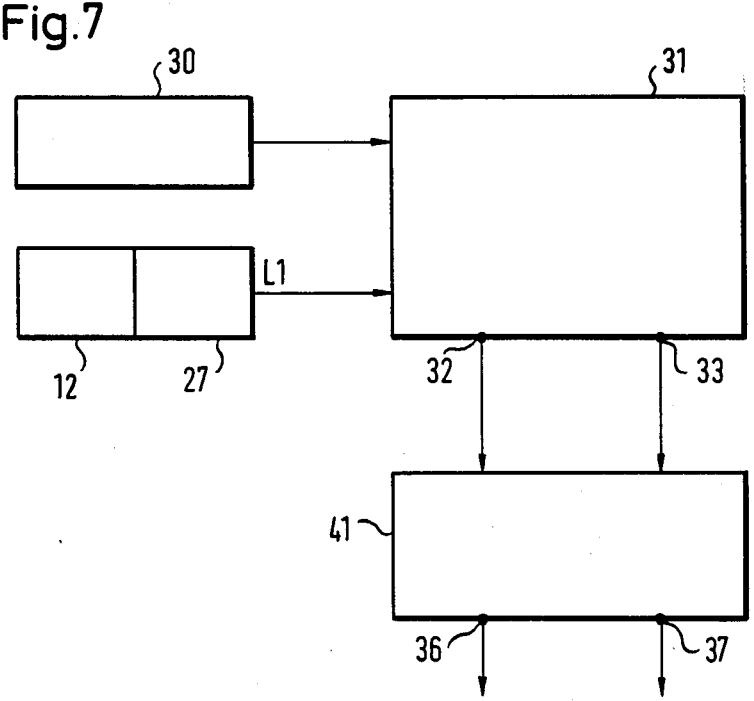

An embodiment of the invention will now be described by way of example only and with reference to the accompanying drawings in which are shown:

FIG. 1 a developed view of the outside of the cylindrical side wall of a slotted drum aperture member illustrating the field of view of the photoelectric detector arrangement including the image of part of an ampoule illustrated in dotted lines, FIG. 2 a diagram showing the extent of the total field of view illustrated in dotted lines in FIG. 1, FIG. 3 a view of the end of an ampoule which is to be read by the reading apparatus of the present invention and the intermediate image of which is shown in dotted lines in FIG. 1, FIG. 4 an axial section through one form of a slotted drum aperture member suitable for use in the present reading apparatus, FIG. 5 a plan view of the subject of FIG. 4, FIG. 6 a circuit block diagram of a first part of a processing circuit for processing signals generated by the reading apparatus of the previous figures, FIG. 7 a circuit block diagram of a further part of the processing circuit for further processing the signals formed by the circuit of FIG. 6.

Referring firstly to FIGS. 1 to 5 there is shown an apparatus suitable for the detection and reading of coloured markings applied to an object movable relative to the apparatus. The layout of the apparatus corresponds in general with that shown in British Pat. No. 1,397,837.

As previously mentioned British Pat. No. 1,397,837 basically discloses an illuminating system for illuminating an object, an optical processing system including a slotted drum aperture member for optically processing images of the illuminated object and an optical receiving and detection device for passing the processed images onto photoelectric detectors.

The illuminating system and the receiving and detection device intended for use with the present invention are conveniently the same as those shown in British Pat. No. 1,397,837 and the optical processing system is similar in its layout.

As the present set of drawings do not include any illustration of an illuminating system the illuminating system disclosed in British Pat. No. 1,397,837 will be briefly described in more detail in order to make the operation of the present apparatus more readily comprehensible.

In the illuminating system of British Pat. No. 1,397,837 a halogen lamp is used to produce two cold beams of illuminating light which are directed via lenses and mirrors along two spaced apart paths and then along convergent paths so as to eventually converge as two coincident elliptical patches of light on a track on a common plane along which the relatively movable object provided with coloured markings is to move.

The slotted drum aperture member 16, best seen in FIG. 4 of the present drawings, is located within the space between the convergent beams of light and light reflected or scattered from an object moving through the illuminated patch of light is gathered by an optical system including a lens (not shown but which can be identical with that of British Pat. No. 1,397,837) and directed onto an inclined mirror 34 located inside the slotted drum aperture member 16.

As the objects bearing the coloured markings are moving from left to right across the plane of the paper beneath the mirror 34 the image of the coloured markings is caused to move downwardly across the field aperture 35 of the optical system. This direction of movement defines a first direction.

The slotted drum aperture member 16 which rotates at a relatively high speed, typically 3000 r.p.m, about its central axis has a series of optical apertures comprising read apertures in the form of slots or slits 17 in its cylindrical periphery, together with further apertures whose function will be later explained. The read apertures 17 which are of elongate rectangular form are each arranged parallel to the central axis of the drum and, on rotation of the drum, move sequentially past the image of the coloured markings in a second direction transverse to the above-described first direction.

Light reflected from the mirror 34, which is stationary relative to the drum is directed through the read apertures 17 so that an image of the markings on an object moving beneath the slotted drum aperture member can be formed at the field aperture of aperture diaphragm 35, which can be regarded as substantially coplanar with the read apertures 17, and the light beams forming this image are subsequently received and detected in the receiving and detection device indicated generally at 12.

The aperture diaphragm 35 is preferably constructed in the same way as the equivalent aperture diaphragm of British Pat. No. 1,397,837 and basically comprises a circular disc with a central rectangular aperture behind which is placed a convergent lens.

The receiving and detection device 12 is largely the same as that disclosed in British Pat. No. 1,397,837 and features an inclined colour splitting plate or mirror, well known per se, and which has the function of allowing blue light to pass through the mirror and of reflecting the red and green portions downwardly away from the surface thereof.

The blue-light beam is subsequently directed via a further convex lens onto the operative surface area of a blue light detecting photoelectric detector and the red and green light is likewise directed via a further convex lens onto the operative surface areas of two further photodetectors. Red and green colour filters are positioned in front of respective ones of the two further photodetectors so that one produces a signal corresponding to the presence of red light and the other produces a signal corresponding to the presence of green light. The outputs from these two photodetectors are then passed together with the output from the blue light photodetector to a processing circuit illustrated as a rectangular block and which feeds the subsequent processing circuitry later described with reference to FIGS. 6 and 7 of the present drawings.

The optical processing system including the slotted drum aperture member 16 will now be described in more detail.

As previously mentioned the slotted drum aperture member 16 has the read apertures 17 arranged regularly spaced around its periphery so that on rotation of the drum as illustrated by the arrow f of the developed view of FIG. 1 (the second direction) they continuously sweep across the field of view defined by the aperture 35 and thus likewise sweep across the intermediate image 24' of the coloured lines 25 on the ampoule 24.

Between the two read apertures 17 shown illustrated at the right hand side of FIG. 1 there is a smaller rectangular recognition aperture or slot 15 which is slightly less than half the length of the read apertures 17, i.e. approximately 40% of their length but which likewise extends symmetrically about a peripheral line 14 of the slotted drum aperture member.

Looking now at the left hand end of FIG. 1 there can be seen two further read slits 17 between which there is arranged a reference aperture 13 which is likewise positioned on the peripheral line 14. A code track 11 is arranged beneath the region containing the various apertures 13, 15 and 17 and code marks 18 and 19 can be recognized on the code track 11. The code marks are respectively associated one with each of the apertures 13, 15 or 17. The code mark 19 is somewhat wider than the code mark 18 in order to mark the beginning of each revolution of the slotted aperture drum member 16.

As can be seen in FIGS. 4 and 5 the slotted aperture drum 16, which comprises a central hub 21 with an apertured cylinder fixed, eg by welding, to its outer periphery, contains the deflecting mirror 34 which is preferably constructed in the same way as the deflecting mirror of British Pat. No. 1,397,837. Mirror 34 is connected by means not shown to fixed structure outside the slotted aperture drum member and thus remains stationary during rotation of the slotted aperture drum member. A bore 20 is provided in the hub 21 of the drum through which a light beam 22 from a illuminating lamp (not shown) falls on a further deflecting mirror 23 which is fixedly connected to the slotted aperture drum member and which is located in the immediate vicinity of the reference aperture 13. As the slotted aperture drum member rotates the mirror 23 periodically directs light via the field aperture 35 onto the receiving and detection system 12. The code track 11 is illuminated by a further internal light source 40 which is located opposite a further photo-receiver 39 arranged outside the aperture drum.

The processing of the signals generated from the apertures 13, 15 and 17 will now be described by reference to the circuit block diagrams of FIGS. 6 and 7:

It is assumed that a sequence of apertures comprising two read apertures 17, a recognition aperture 15, two further read apertures 17 and a reference aperture 13 are provided on the periphery of the slotted aperture drum member as illustrated in FIG. 1.

The signals given by the code track photo-receiver 39 are passed to a decoder 25 which has outputs 17′, 13′, 17′, 17′, 15′, 17′ at which control signals appear corresponding to the passage of the code marks 18 and 19 past the photo-receiver 39. The code marks 18 and 19 are so arranged relative to the apertures 13, 15 and 17 that as the sequence of apertures 17, 13, 17, 17, 15, 17 etc. pass the photoelectric converter arrangement 12 the associated control signals are present at the outputs 17′, 13′, 17′, 17′, 15′, 17′ etc.

As seen in FIG. 6 the four outputs 17′ are connected to the four inputs of an OR gate 26. The output of the OR gate 26 is connected to one input of an AND gate 27 and the other input of this AND gate is supplied with a signal from the output of the photoelectric converter arrangement 12. This arrangement means that signals only appear at the output of the AND gate 27 during the time in which the read apertures 17 are sweeping over the aperture 35 defining the field of view of the receiving and detection system.

The control signal output 15′ associated with the recognition aperture 15 and the output 13′ are each connected to a respective input of two further AND gates 28 and 29. The output of the photo-electric convertor arrangement 12 is likewise fed to the other inputs of these two further AND gates 28 and 29.

In this manner a read signal L1 is present at the output of the AND gate 27 for recognition of the coloured marking whilst the read aperture 17 sweeps over the aperture 35. At the output of the AND gate 28 a signal L2 is present for recognition of the central position of the ampoule and occurs when the shorter recognition aperture 15 crosses the field of view of the aperture 35. The signal L3 at the output of the AND gate 29 allows the white value to be recognized.

As seen in FIG. 7 the output signal L1 of the AND gate 27 is applied to a comparator 31 to the other input of which a desired value for the colour signal is passed by means of a keyboard. In the comparator 31 the desired value supplied by the desired value controller 30 and the actual value delivered by the read apertures of the slotted aperture drum member 16 are continuously compared with one another.

The comparator 31 has two outputs 32, 33. A signal appears at the output 32, when the desired and actual values given by the passage of the read aperture 17 past the field of view determined by the aperture 35 agree within a given tolerance. A signal appears at the output 33 when agreement does not exist between the desired value and the actual value occuring during passage of the read slit 17 past the field of view defined by the aperture 35.

As the speed of rotation of the slotted aperture drum member is relatively high, in relation to the speed of movement of objects beneath the illuminated patch of light, each object is scanned many times and gives rise to a series of signals from various ones of the read apertures 17; of these signals some will be correct and some incorrect depending on the precise location of the object etc. and the criterion chosen for a recognition is that the number of correct readings exceeds the number of incorrect readings.

This requirement of the criterion is tested by applying the outputs 32 and 33 to a forward-rearward counter 41, counts forwards when a positive correct reading appears at the output 32 and backwards when a negative incorrect reading appears at the output 33. Thus the counter 41 counts the difference of the quantities between positive and negative readings.

The forward-rearward counter 41 has two outputs 36 and 37 of which the output 36 gives the signal when more positive readings are registered than negative readings. In contrast a signal appears at the output 37 when the number of negative readings exceeds the number of positive readings.

A predetermined combination of coloured lines on the ampoule 25 is thus recognized as correct when a signal appears at the output 36 of the counter 41. If a signal appears at the output 37 then the colour combination recognized is incorrect.

The correct/incorrect signal can then be utilised by further apparatus not forming part of the present invention for sorting or other purposes.

It will be understood that only read signals occurring when a corresponding recognition signal is present at L2 are to be detected. The signal at L2 can be used in a number of ways to control the operation of the processing circuitry. It can for example simply initiate an electrical switch, provided with a built in delay corresponding to the time period between the passage of successive aperture slots past the aperture diaphragm 35, to switch either the comparator or the counter on and off. Alternatively the output of the switch could be connected to a further AND gate which checks for the presence of the signals L1 and the delayed signal from L2.

Although the present invention has been described with reference to the accompanying drawings it will be apparent to those skilled in the art that many modifications can be made to the above described apparatus without departing from the present teaching. It is contemplated for example that, whilst the slotted aperture member herein described is preferably in the form of a drum in which it is best able to withstand the speed of rotation necessary to produce peripheral movement of the various apertures past the aperture 35, it could equally be in the form of an endless steel band driven around rollers or equally in the form of an endless moving band of opaque film material with transparent portions providing the necessary optical apertures. In these latter two forms it would of course be necessary to modify the means by which the white value signal is achieved but this could for example be achieved by means of suitable shutter to sequence the white light calibration signal with the passage of the apertures 15 past the field of view defined by aperture 35. In an alternative embodiment the optical apertures are formed in the rim of a rotating disc.

It will be further appreciated that whilst the present invention has been described with reference to the presence of three coloured markings it would be possible to deal with more markings than this by enabling the reading and detection system to separately detect more than three colours and by suitably modifying the processing circuitry.

We claim:

1. Reading apparatus suitable for reading a series of colored markings arranged one behind the other on an object the apparatus comprising an illuminating system for producing an illuminating beam of light capable of illuminating said colored markings provided on an object during relative movement thereof through the beam of light, optical means capable of receiving light from said colored markings and forming an image thereof moving in a first direction past an aperture member, the aperture member having a series of spaced apart optical apertures including first read apertures and at least one relatively smaller recognition aperture, there being further provided means for producing movement of said series of optical apertures in a second direction transverse to said first direction whereby said at least one recognition aperture and said first read apertures move transversely across said image, a color sensitive photoelectric detector arrangement disposed behind the aperture member to receive light from the colored markings and transmitted through any of said first read apertures and said at least one recognition aperture to provide respective reading and recognition signals and means for recognising a reading signal only when a corresponding recognition signal has been detected which shows that said image is correctly aligned with said first read apertures.

2. Reading apparatus according to claim 1 and wherein the said at least one recognition aperture is symmetrically arranged about the central line along which the series of read apertures are arranged.

3. Reading apparatus according to claim 1 and wherein the length of the said at least one recognition aperture lies in the range from 5 to 95% of the length of the read apertures.

4. Reading apparatus according to claim 3 and wherein the length of said at least one recognition aperture lies within the range 30 to 50% of the length of the read apertures.

5. Reading apparatus according to claim 4 and wherein the length of said at least one recognition aperture is approximately 40% of the length of the read apertures.

6. Reading apparatus according to claim 1 and wherein said first read apertures and also said at least one recognition aperture are of rectangular shape and of the same width.

7. Reading apparatus according to claim 1 and wherein the said at least one recognition aperture is disposed intermediate two read apertures and is equally spaced from these read apertures.

8. Reading apparatus according to claim 1 and wherein in addition to said first read apertures and said at least one recognition aperture, the aperture member has at least one reference aperture through which a beam of white light drawn from the illuminating system is projected onto the photoelectric detector arrangement during the movement of said reference aperture past said photoelectric detector arrangement.

9. Reading apparatus according to claim 8 and wherein said reference aperture is a circular aperture arranged on the central line along which said read apertures are spaced apart.

10. Reading apparatus according to claim 9 and wherein said circular reference aperture has a diameter approximately equal to the width of said read apertures.

11. Reading apparatus according to claim 8 and wherein said reference aperture is centrally located between two read apertures.

12. Reading apparatus according to claim 1 and wherein said aperture member includes a code track alongside said series of optical apertures and having a respective code mark associated with each aperture.

13. Reading apparatus according to claim 12 and wherein said code marks are displaced relative to the associated apertures in said second direction.

14. Reading apparatus according to claim 8 and wherein said aperture member comprises a rotatable drum having a cylindrical wall with said series of optical apertures including said reference aperture being provided in said cylindrical wall there being in addition, a further aperture in the hub of said drum in the vicinity of the reference aperture and means for deflecting a portion of the light beam from said illuminating system through said further aperture and via a deflecting mirror fixedly associated with the drum through said reference aperture onto the photoelectric detector arrangement.

15. Reading apparatus according to claim 1 and wherein there is further provided a comparator, means for passing signals generated from said photoelectric detector arrangement and corresponding to an actual colored marking to one input of said comparator, means for passing a second signal representative of a desired color marking to the second input of said comparator and means for passing the output of said comparator in the presence of a corresponding recognition signal to a forward rearward counter for detecting the difference between the number of correct comparisons and incorrect comparisons and means for providing a correct/incorrect signal at the output of said forward-rearward counter depending on the sign and size of said difference.

16. An aperture member suitable for use with the apparatus of claim 1.

17. Reading apparatus according to claim 1 and wherein said aperture member comprises a rotatable drum having a cylindrical wall with said series of optical apertures being provided in said cylindrical wall.

18. Reading apparatus according to claim 1 and wherein the shape of said first read apertures corresponds with the shape of each of said colored markings.

* * * * *